(12) United States Patent
Wyman et al.

(10) Patent No.: US 7,360,637 B1
(45) Date of Patent: Apr. 22, 2008

(54) METERING SYSTEM

(75) Inventors: Eric Wyman, Austin, TX (US);
Thomas Pearce, Ruther Glen, VA (US);
Mark Manzi, Chesterfield, VA (US);
Roland Lomerson, Jr., Bradenton, FL (US)

(73) Assignee: Bakery Holdings LLC, Richmond, VA (US)

( * ) Notice: Subject to any disclaimer, the term of this patent is extended or adjusted under 35 U.S.C. 154(b) by 396 days.

(21) Appl. No.: 11/209,371

(22) Filed: Aug. 23, 2005

(51) Int. Cl.
*B65G 47/26* (2006.01)
(52) U.S. Cl. .................................. 198/419.1; 198/418.7
(58) Field of Classification Search ............ 198/419.1, 198/418.7, 432, 368, 351
See application file for complete search history.

(56) References Cited

U.S. PATENT DOCUMENTS

| | | | | | |
|---|---|---|---|---|---|
| 5,303,811 | A | * | 4/1994 | Haley ....................... | 198/419.1 |
| 5,893,701 | A | * | 4/1999 | Pruett ....................... | 198/419.1 |
| 6,131,372 | A | * | 10/2000 | Pruett ....................... | 198/419.1 |
| 6,321,896 | B1 | * | 11/2001 | Zuccheri et al. ......... | 198/419.1 |
| 7,128,217 | B2 | * | 10/2006 | Henry ....................... | 198/418.7 |

* cited by examiner

*Primary Examiner*—James R Bidwell (57) ABSTRACT

A metering system for handling product through a packaging operation comprising: a mechanism for transporting individual product units in discrete lanes to a staging area ahead of a subsequent processing operation; a stop for restraining the flow of product before it enters the subsequent processing operation; a mechanism for detecting when a predetermined quantity of product has accumulated in each lane of the staging area against the stop; and a mechanism for restraining by individual lane further quantities of product before they enter the staging area.

9 Claims, 8 Drawing Sheets

METERING SYSTEM

FIELD OF THE INVENTION

The present invention relates to packaging devices and more particularly to a metering device for staging predetermined amounts of items to be packaged.

BACKGROUND OF THE INVENTION

In automated packaging systems, that include a mechanism for moving product along a belt or similar device, incoming product is arranged in units for packaging in predetermined quantities just before actual packaging of the product units. In such systems, some mechanism must be provided to allow the predetermined quantity of product to be "counted" and arranged before it advances into the actual packaging or enclosure portion of the packaging apparatus. In many such systems moving product is simply allowed to back-up against a stop of one sort or another in the packaging apparatus, and the appropriate quantity as measured, for example, by length or the like is then allowed to move to the actual packaging operation. While this arrangement is satisfactory for many products, for some more delicate products, for example baked goods, if they are allowed to simply back-up, the most forward product will be crushed by the incoming flow of product, accurate packaging of the proper number of items can be disrupted and product lost due to damage caused by the force of the incoming product crushing the product already in the packaging position. In the packaging of such delicate products, it would therefore be desirable to have a mechanism for metering and staging the appropriate number or quantity of such delicate products at a point before the actual unit packaging operation.

OBJECT OF THE INVENTION

It is therefore an object of the present invention to provide a metering system that allows for the staging of the predetermined quantity of units at a point just ahead of the actual package forming operation such that no product is damaged during packaging and the proper number of product units are introduced into the packaging operation.

SUMMARY OF THE INVENTION

According to the present invention, there is provided a metering system for handling product through a packaging operation comprising: a mechanism for transporting individual product units in discrete lanes to a staging area ahead of a subsequent processing operation; a stop for restraining the flow of product before it enters the subsequent processing operation; a mechanism for detecting when a predetermined quantity of product has accumulated in each lane of the staging area against the stop; and a mechanism for restraining by individual lane further quantities of product before they enter the staging area.

DETAILED DESCRIPTION

Figure 1:
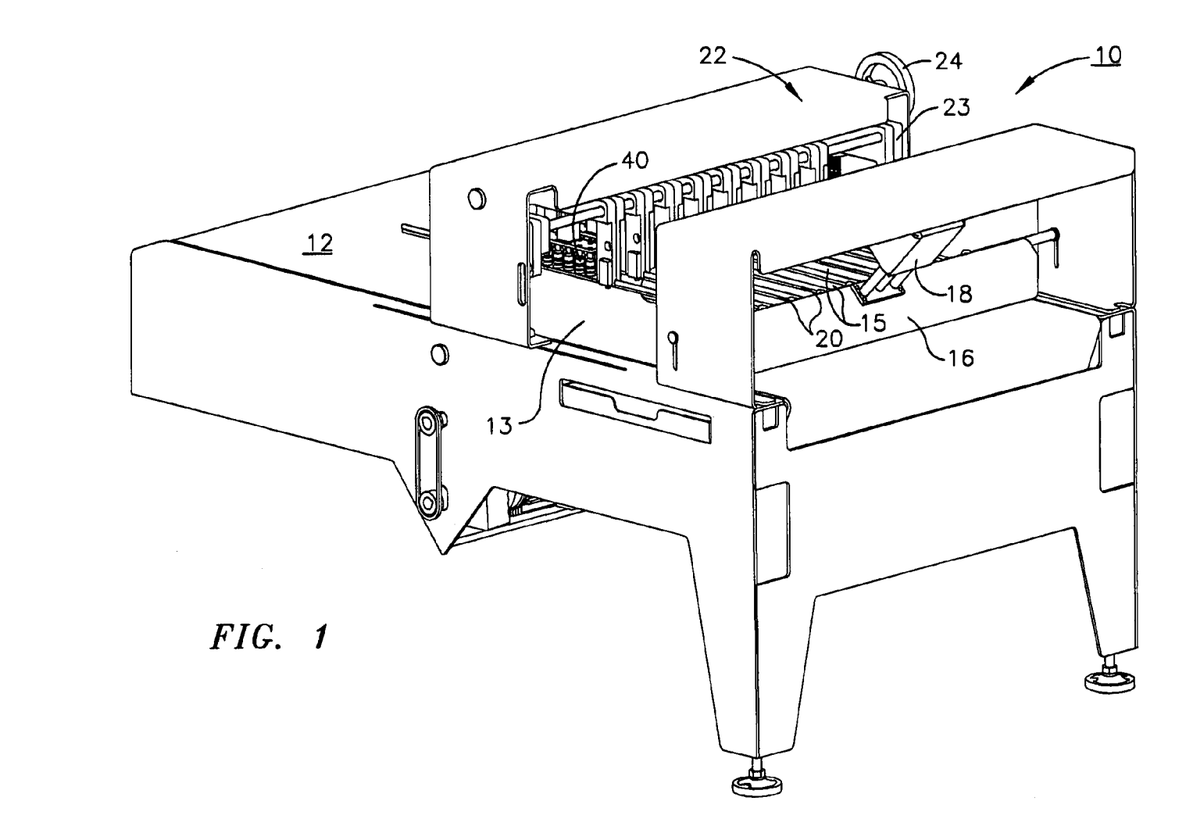
FIG. 1 is an isometric view of the metering system of the present invention.

Referring now to the accompanying drawings, shown in FIG. 1 is an isometric view of the metering system of the present invention. As shown in FIG. 1 metering system 10 comprises: a mechanism 12 for transferring product in the direction indicated by arrow 14 (in this depiction, it is a belt 12, but other configurations are clearly possible); lane guides 20 that guide incoming product into individual lanes 15 on belt 12; a stop 16 that can be placed into or out of the flow of product through the action of mechanism 18; a product restraint mechanism 22 described in greater detail below; and a staging area 13 defined by stop 16 and the forwardmost of bellows 40 described below. Product restraint mechanism 22 is located above belt 12 on support 36 and is adjusted horizontally along the length of belt 12 through a rack and pinion arrangement (not shown in detail) that is adjusted by the turning of adjustment wheel 24. The height or restraint mechanism 22 above transport mechanism 12 is adjusted by turning wheel 25.

Figure 2:
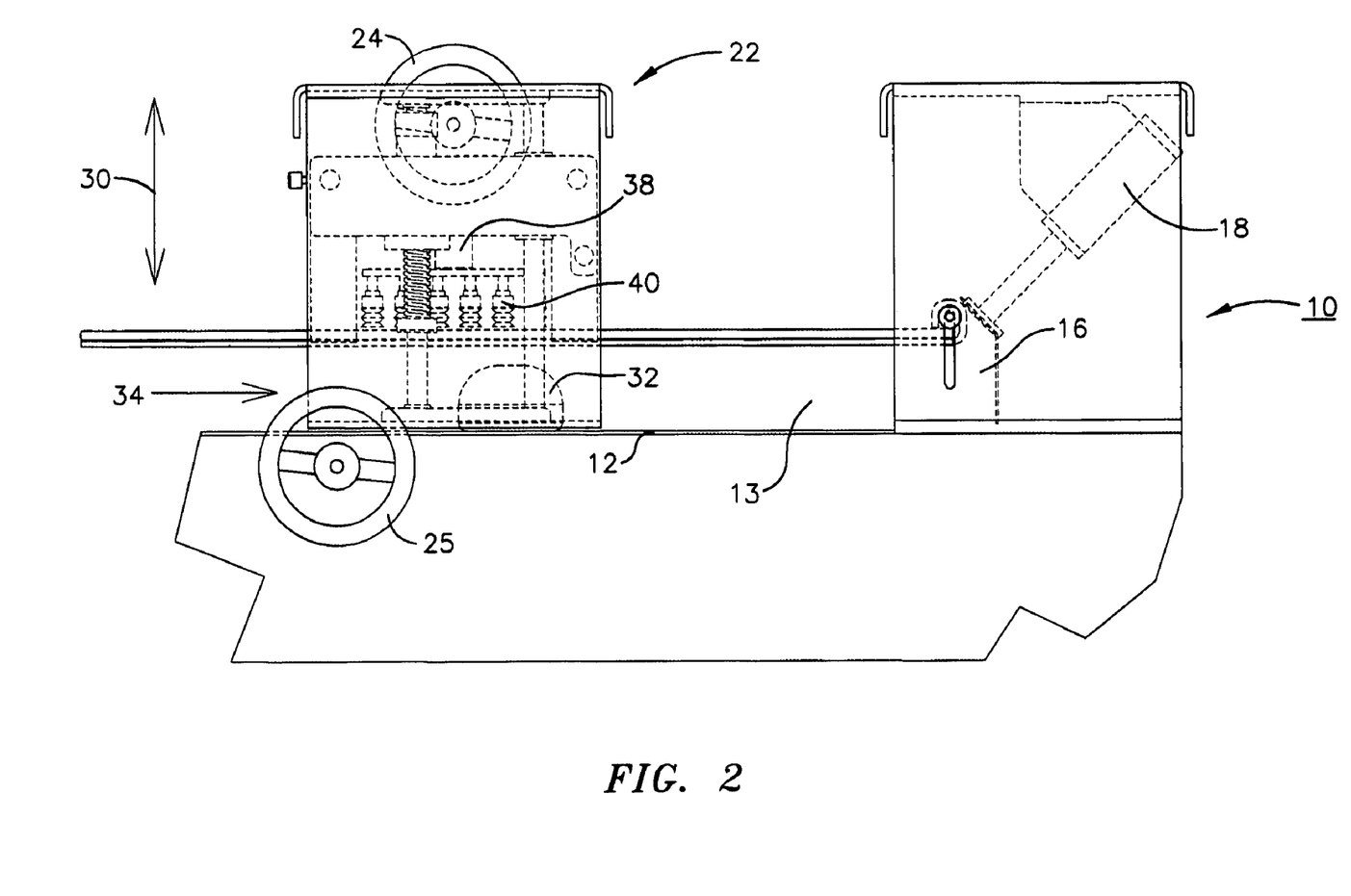
FIG. 2 is a schematic side view of the essential elements of the metering system of the present invention.
Figure 3:
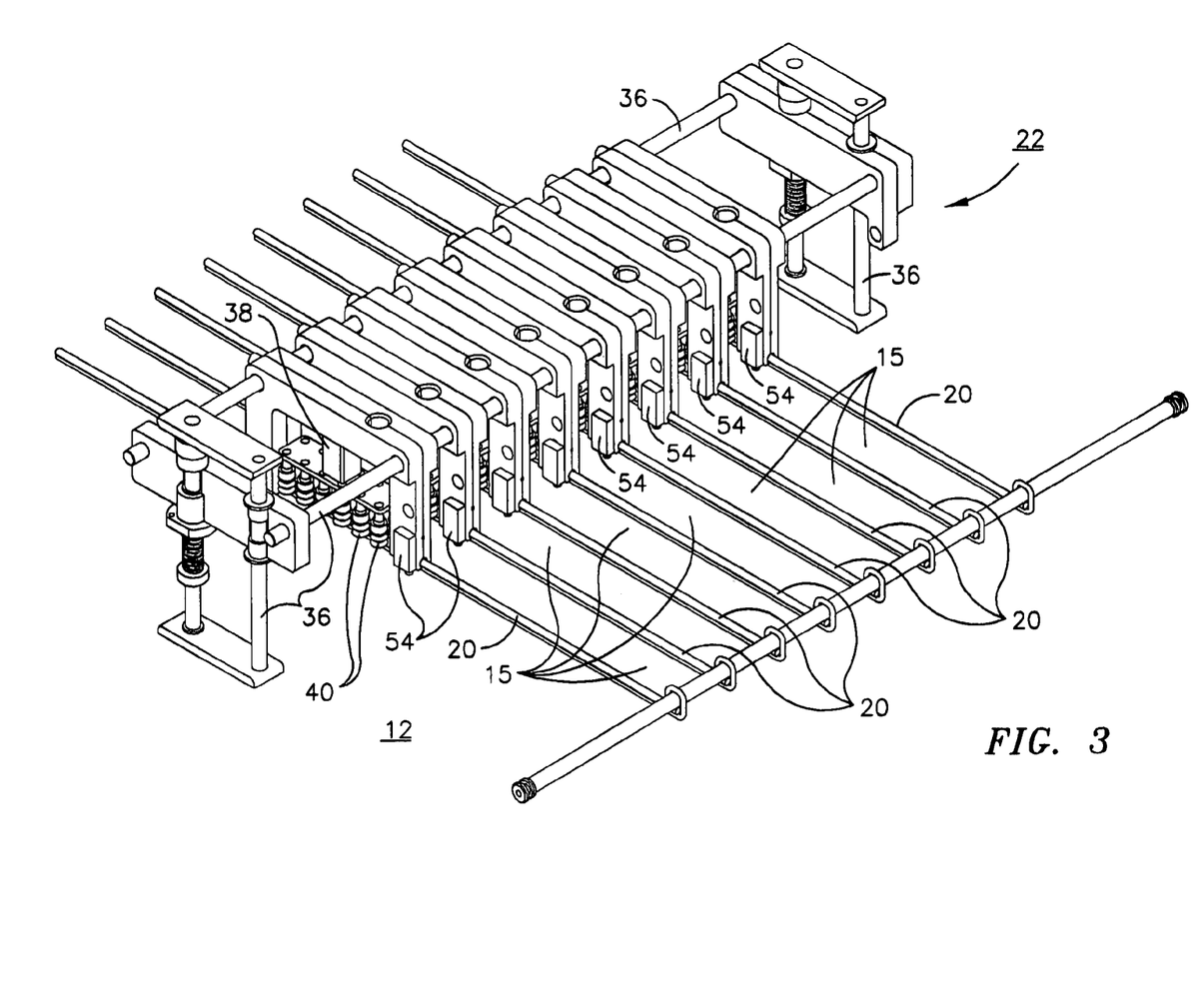
FIG. 3 is an isometric view of the incoming product restraint portion of the metering system of the present invention.

Referring now to FIG. 2 that depicts an overall side view of the details of metering system 10 of the present invention. As shown in FIG. 2, product restraint mechanism 22 comprises a detector 26 (described in detail below in connection with FIG. 4), and a hold down 38 capable of vertical movement as represented by arrow 30. In this Figure hamburger buns 32 are moving in the direction shown by arrow 34 and stop their forward motion upon engagement with stop 16. As shown in FIGS. 1 and 3, restraint mechanism 22 is suspended over belt 12 along which buns 32 are moving by a support structure 36 that is adjustable along the length of belt 12 as described above. Restraint mechanism 22 comprises a pneumatic or hydraulic cylinder or other mechanical system 38 that provides vertical movement as shown by arrow 30, and an array of bellows 40 aligned with individual lanes 15 of incoming product within the confines of lane guides 20 shown in FIGS. 1 and 3. While bellows 40 (best seen in FIGS. 5 and 6) could be vacuum activated, such activation is not necessary since bellows 40 are preferably fabricated from a soft, pliant and tacky material such as rubber and their collapse upon and contact with incoming product as described below does not require the presence of a vacuum to restrain incoming buns 32. The mere gentle placement of bellows 40 into non-crushing contact with buns 32 is adequate to restrain further forward movement as restraint mechanism 22 is activated by the action of detector 26 or 54 (the latter is described hereinafter) detecting the presence of a predetermined quantity of buns in each of lanes 15.

Figure 4:
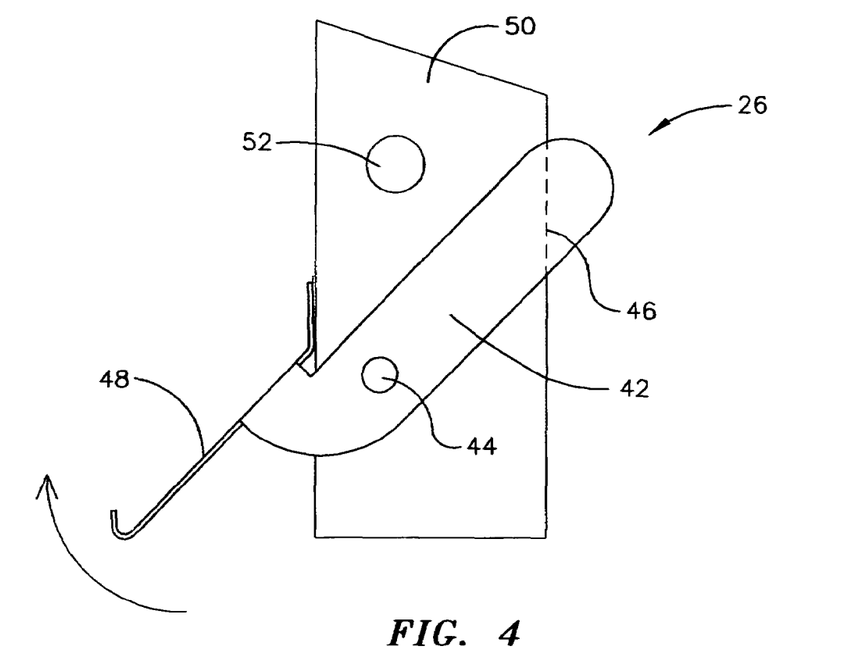
FIG. 4 depicts one alternative embodiment of a product unit detector or sensor of the metering system of the present invention.
Figure 5:
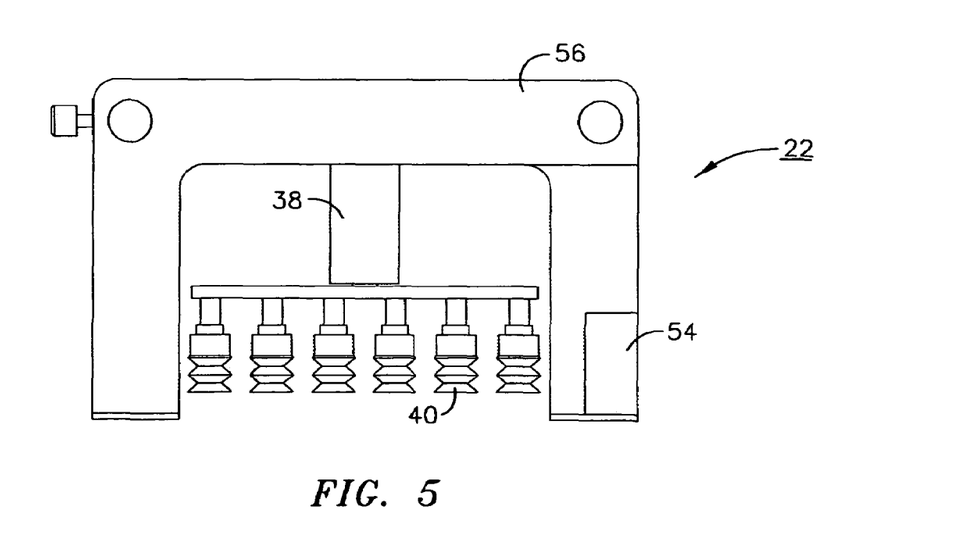
FIG. 5 is a schematic side view of another alternative embodiment of the incoming product restraint portion of the metering system of the present invention.

As best seen in FIG. 4, according to one preferred embodiment of the present invention, individual detectors 26 comprise an arm 42 rotatably attached at an intermediate position 44 to a support 50 having an aperture 52 therein and include a flag end 46 and a sensor end 48 that comprises a wire or other extension that contacts buns 32 as they pass thereunder. A support 50 is located between each of the lanes of moving product and the action of buns 32 engaging sensor ends 48 as buns 32 pass under restraining mechanism 22 causes arm 42 to rotate exposing apertures 52. A photo eye having a sending portion and a mirror for reflectance of an emitted beam, or some similar device, is aimed to pass through adjacent apertures 52. When all of arms 42 are engage by contact of sensor ends 48 with a bun 32 in every lane (see FIG. 2), a clear view from one side of restraint mechanism 22 to the other through adjoining apertures 50 is provided, trigerring downward movement of bellows 40 to engage any additional buns 32 and restraining their entry into staging area 13.

Figure 6:
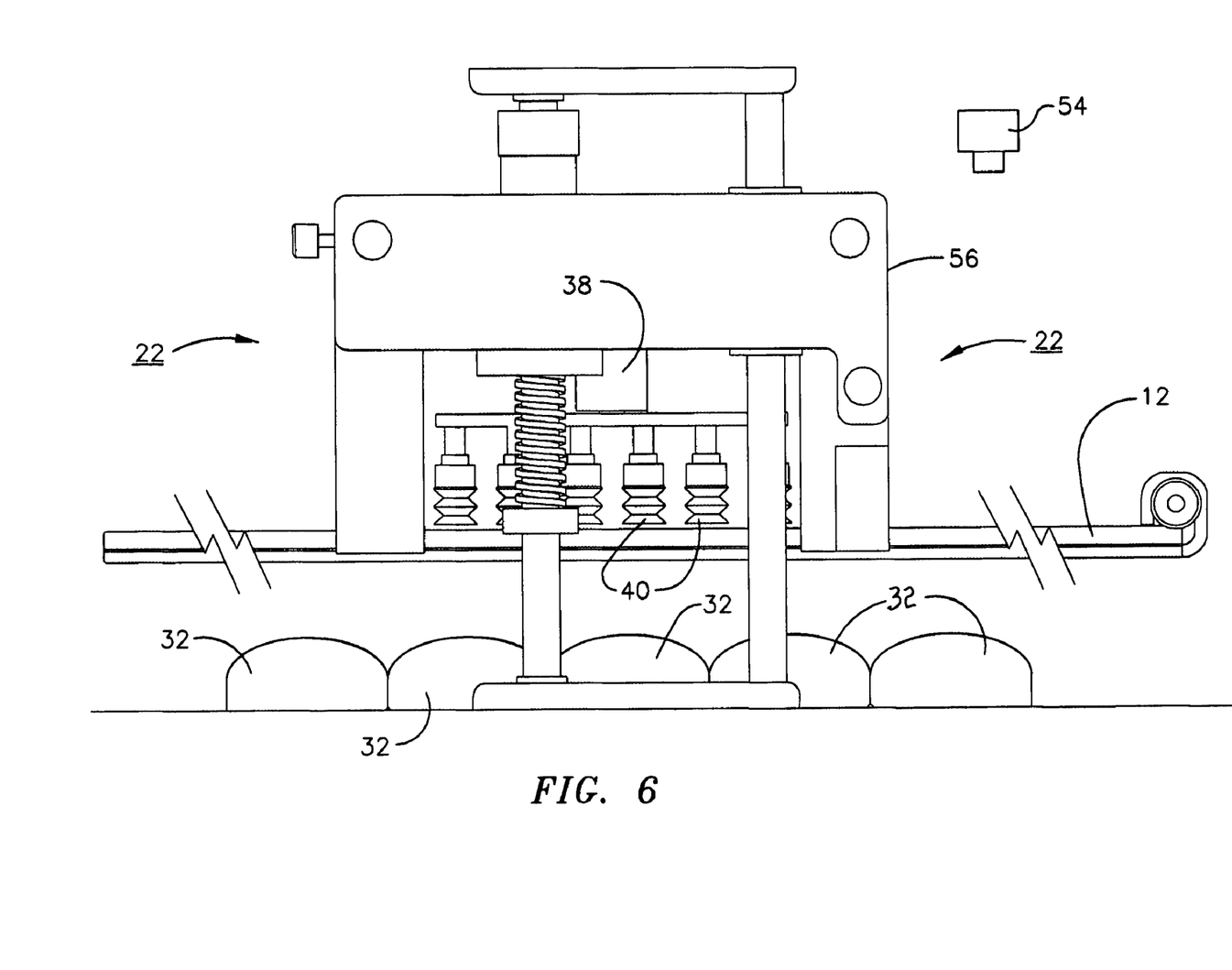
FIG. 6 shows the device of FIG. 5 in the context of the product moving or transport mechanism.

Depicted in FIG. 6 in connection with an alternative side view of restraining mechanism 22 is a representation of an alternative configuration for sensor 26. According to this preferred alternative embodiment of sensor 26, sensor 26 is a photo eye 54 that "looks" downward from the back or downstream edge 56 of restraint mechanism 22. As in the case where sensor 26 shown in FIG. 4 is used, in the embodiment depicted in FIG. 6, a photo eye 54 is used in each individual lane 15 of metering device 10. The use of photoeye 54 allows for individual lane control of advancing product rather than permitting only "bulk" or "batch" control of incoming product 32 as in the case of the sensor depicted in FIG. 4. Thus, when an individual lane of staging area 13 is loaded as prescribed, only restraint mechanism 22 located in that lane descends inhibiting the passage of further items of product 32 in that specific lane. When sufficient product has been amassed against stop 16 in each lane, i.e. the desired number of product, for example, buns 32 has been collected in any individual lane, a signal is provided to cause restraining mechanism 22 to move bellows 40 downward (see arrow 30 in FIG. 2) such that additional individual buns 32 are inhibited from entering staging area 13 in that lane. At the point in the operation of metering system 10 where a prescribed/predetermined number of items 32 has entered staging area 13 on a lane by lane basis (using a photoeye sensor 54) or in "bulk" (using the sensor system of FIG. 4), stop 16 is raised (opened), the predetermined number of buns 32 collected in staging area 13 in each individual lane allowed to pass into the packaging or other subsequent operation, stop 13 is again lowered into the staging area loading position (closed) and the next batch of buns 32 allowed to advance into the staging area by upward movement of restraint 22, i.e. bellows 40, until another predetermined load of buns 32 has been collected in staging area 13 for release into the packaging operation downstream of metering mechanism 10. Although stop 16 has been described in one moving configuration, it will be readily apparent that any number of alternative stop arrangements could be used in the successful practice of the resent invention, including but not limited to stops that descend or ascend vertically from above, stops that enter from the side of metering system 10 and any and all such alternatives are meant to be included within the scope of the appended claims.

Figure 7:
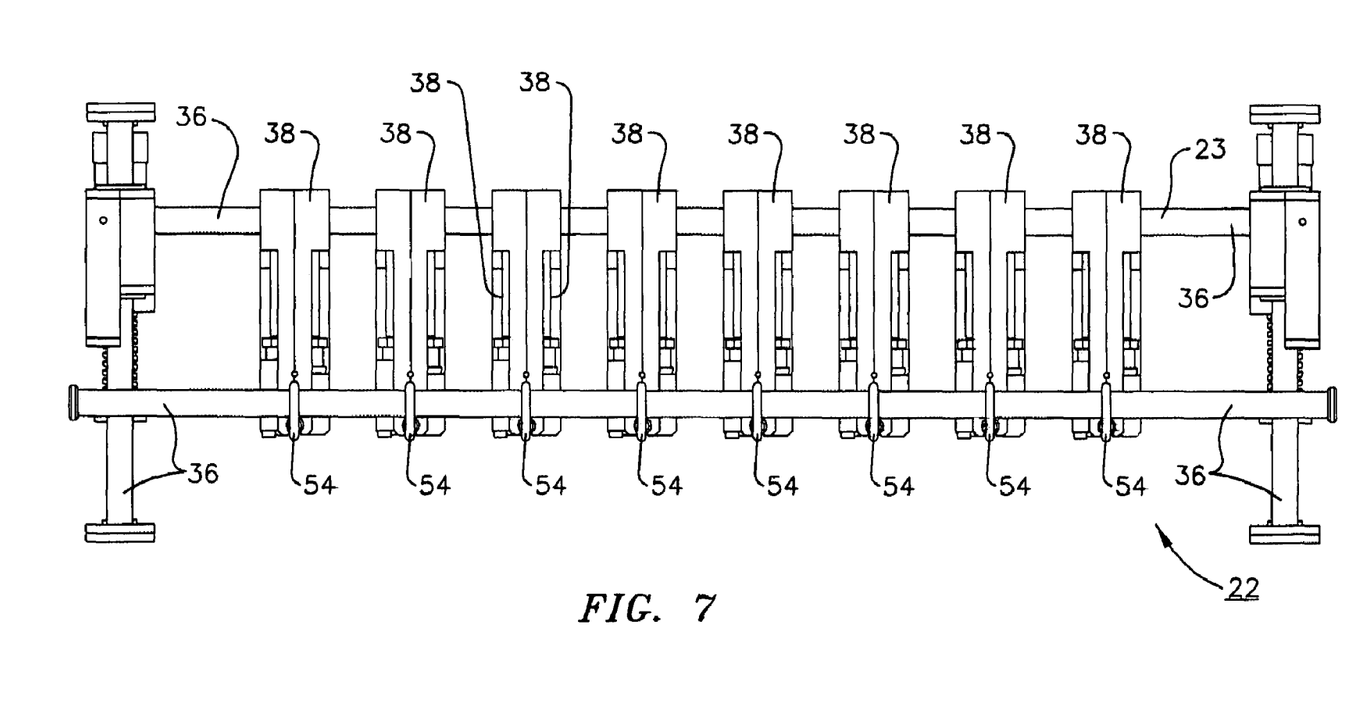
FIG. 7 is an end view of the product unit detectors and the incoming product restraint portion of the metering system of the present invention.

FIG. 7 depicts an end view of one embodiment of the restraining mechanism 22 as it would appear from the downstream end of metering system 10. As clearly shown in this Figure, a sensor 26 or 54 (either the sensor of FIG. 4 or a photoeye that allows for individual lane control as described above) and an array of bellows 40 is present over each of product lanes 15 such that operation of metering system 22 as just described can occur.

Figure 8:
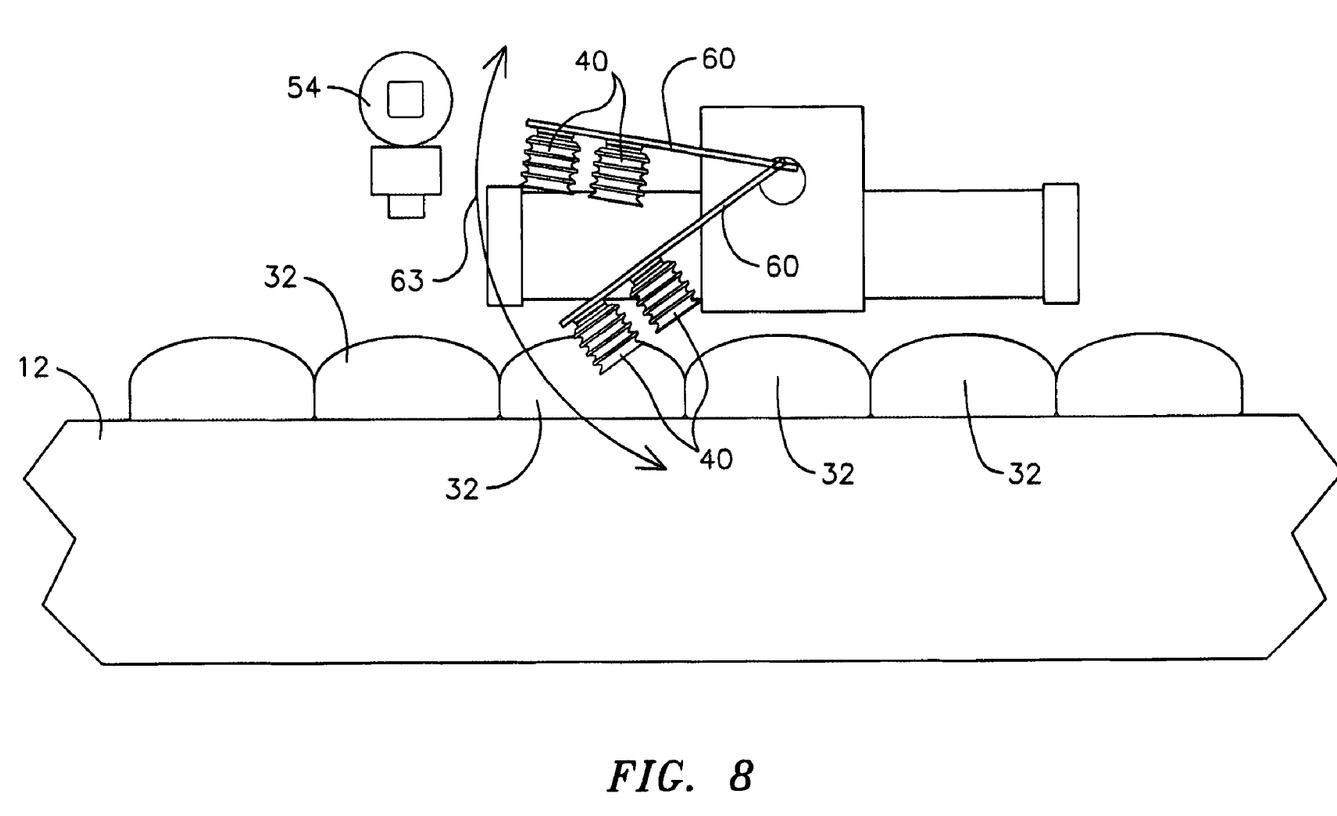
FIG. 8 depicts an alternative embodiment of the incoming product restraint portion of the metering system of the present invention.
Figure 9:
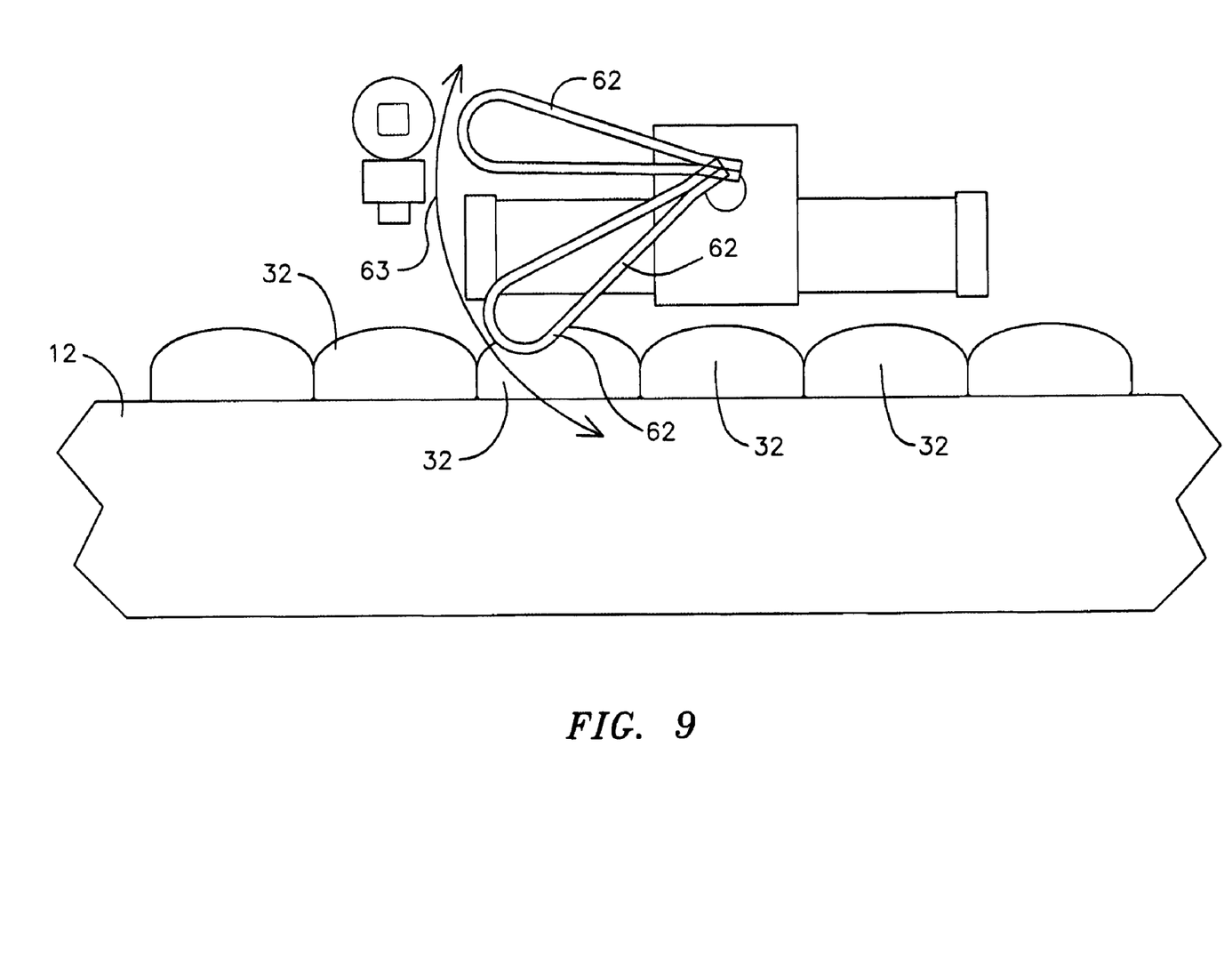
FIG. 9 depicts yet another alternative embodiment of the incoming product restraint portion of the metering system of the present invention.

Depicted in FIGS. 8 and 9 are alternative structures for bellows 40 previously described. In FIG. 8, bellows 40 similar to those described in connection with earlier described embodiments are rotationally brought into contact with buns 32 in order to restrain their advancement. In this embodiment, bellows 40 are attached to the ends of rotating arms 60 such that in the "up" position depicted at the upper part of the Figure bellows 40 are disengaged from buns 32, while when rotated into the "down" position depicted at the lower portion of FIG. 8 (as represented by arrow 63) bellows 40 engage buns 32 restraining any further advancement thereof until the appropriate time in the metering cycle.

FIG. 9 depicts yet another alternative embodiment of a restraining device suitable for use in connection with the metering system 10 described herein. According to this embodiment, a hold down belt 62 is rotated in the direction of arrow 63 to obtain disengagement of hold down belt 62 with buns 32 in the "up" position and engagement of hold down belt 62 with buns 32 in the "down" position at the appropriate times in the metering cycle. Photoeye 54 detects the appropriate number of buns in each lane.

Thus, in operation, buns 32 approach staging area 13 in lanes 15 and pass through against stop 16. When the predetermined number of buns 32 has accumulated in any given lane as sensed by detector 26/54, restraint mechanism 22 descends or rotates in that lane and bellows 40 or hold down belts 62 engage additional incoming buns 32 and hold them in position for subsequent entry into staging area 13. In this fashion, the appropriate number of buns 32 is staged for packaging/handling as a unit in the subsequent operation(s) and no crushing of incoming buns 32 occurs.

There as thus been described a novel system for metering product advancing on a transfer mechanism, which system is capable of metering even crushable products such as bakery products without damage to such products.

Although the metering system described herein has been described largely in the context of a product metering system for metering the delivery of product units, especially baked goods, to a packaging operation, it will be readily apparent that the metering system of the present invention is equally applicable to the handling of any product that travels through a transport system as individual units that are subsequently staged into collections of larger numbers of product units and then passed on in such collections of larger number product units to a subsequent handling or processing operation.

As the invention has been described, it will be apparent to those skilled in the art that the same may be varied in many ways without departing from the intended spirit and scope of the invention, and any and all such modifications are intended to be included within the scope of the appended claims.

What is claimed is:

1. A product metering system comprising:
   A) a transport mechanism for transporting individual product units in lanes to a staging area ahead of a subsequent product unit handling operation said mechanism for transporting having an upstream and a downstream end;
   B) a moveable stop for restraining the flow of product units before they enter the subsequent handling operation on either a lane by lane or bulk basis;

C) a mechanism for detecting when a predetermined quantity of product has accumulated in each lane of the staging area comprising;
  i) a support over the transport mechanism;
  ii) a flange extending downward from the support over each of the lanes;
  iii) registering individual apertures in each of the flanges; and
  iv) a sensor comprising;
    a) a photo eye located at one end of the support structure; and
    b) a rotating arm having a sensor end that contacts product units passing thereunder and a flag end that selectively covers and uncovers the individual apertures such that when a predetermined number of product units has entered the staging area all of the apertures are uncovered the photo eye detects that all lanes are full and triggers the restraint mechanism; and
D) a restraint mechanism for restraining by individual lane further quantities of product before they enter the staging area once the predetermined quantity of product has accumulated in each lane as detected by the sensor and then releasing the predetermined quantity of product to the subsequent product handling operation.

2. The metering system of claim 1 wherein the restraint mechanism comprises over each of the lanes a vertically moveable array of bellows that are disengaged from product moving thereunder when product is moving into the staging area and descends vertically to engage product when the predetermined number of product units have entered the staging area as detected by the sensor.

3. The metering system of claim 1 wherein the restraint mechanism comprises a vertically rotating bellows or hold down belt over each of the lanes which rotating bellows or hold down belts are disengaged from product moving thereunder when product is moving into the staging area and descend rotationally to engage product when the predetermined number of product units have entered the staging area as detected by the sensor.

4. The metering system of claim 1 wherein the sensor comprises a photo eye over each of the lanes proximate the downstream end of the restraint mechanism looking downward on a lane.

5. A product metering system comprising:
A) a transport mechanism for transporting individual product units in lanes to a staging area ahead of a subsequent product unit handling operation said mechanism for transporting having an upstream and a downstream end;
B) a moveable stop for restraining the flow of product units before they enter the subsequent handling operation on either a lane by lane or bulk basis;
C) a sensor for detecting when a predetermined quantity of product has accumulated in each lane of the staging area against the stop; and
D) a restraint mechanism for restraining by individual lane further quantities of product before they enter the staging area once the predetermined quantity of product has accumulated in each lane as detected by the sensor and then releasing the predetermined quantity of product to the subsequent product handling operation said restraint mechanism comprising:
  i) over each of the lanes a vertically moveable array of bellows that are disengaged from product moving thereunder when product is moving into the staging area and descends vertically to engage product when the predetermined number of product units have entered the staging area as detected by the sensor.

6. The metering system of claim 5 wherein the restraint mechanism comprises a vertically rotating bellows or hold down belt over each of the lanes which rotating bellows or hold down belts are disengaged from product moving thereunder when product is moving into the staging area and descend rotationally to engage product when the predetermined number of product units have entered the staging area as detected by the sensor.

7. The metering system of claim 5 wherein the sensor comprises a photo eye over each of the lanes proximate the downstream end of the restraint mechanism looking downward on a lane.

8. A product metering system comprising:
A) a transport mechanism for transporting individual product units in lanes to a staging area ahead of a subsequent product unit handling operation said mechanism for transporting having an upstream and a downstream end;
B) a moveable stop for restraining the flow of product units before they enter the subsequent handling operation on either a lane by lane or bulk basis;
C) a sensor for detecting when a predetermined quantity of product has accumulated in each lane of the staging area against the stop; and
D) a restraint mechanism for restraining by individual lane further quantities of product before they enter the staging area once the predetermined quantity of product has accumulated in each lane as detected by the sensor and then releasing the predetermined quantity of product to the subsequent product handling operation said restraint mechanism comprising:
  i) a vertically rotating bellows or hold down belt over each of the lanes which rotating bellows or hold down belts are disengaged from product moving thereunder when product is moving into the staging area and descend rotationally to engage product when the predetermined number of product units have entered the staging area as detected by the sensor.

9. The metering system of claim 8 wherein the sensor comprises a photo eye over each of the lanes proximate the downstream end of the restraint mechanism looking downward on a lane.

* * * * *